US012527703B1

(12) United States Patent
Esposito

(10) Patent No.: US 12,527,703 B1
(45) Date of Patent: Jan. 20, 2026

(54) WALKER WHEELCHAIR CONNECTOR DEVICE

(71) Applicant: Michael Esposito, Belleville, NJ (US)

(72) Inventor: Michael Esposito, Belleville, NJ (US)

( * ) Notice: Subject to any disclaimer, the term of this patent is extended or adjusted under 35 U.S.C. 154(b) by 0 days.

(21) Appl. No.: 19/266,943

(22) Filed: Jul. 11, 2025

(51) Int. Cl.
*A61G 5/10* (2006.01)
*A61H 1/02* (2006.01)

(52) U.S. Cl.
CPC ............. *A61G 5/10* (2013.01); *A61H 1/0262* (2013.01)

(58) Field of Classification Search
CPC ................................ A61G 5/10; A61H 1/0262
See application file for complete search history.

(56) References Cited

U.S. PATENT DOCUMENTS 2,556,121 A 6/1951 Thomas
2,596,055 A * 5/1952 Thomas ................... A61G 5/14 482/68
3,398,974 A * 8/1968 Edwards .............. A61G 5/1054 297/5
4,722,572 A * 2/1988 Sata ......................... A61G 5/12 297/423.37
5,741,020 A * 4/1998 Harroun ............... A61G 5/0883 280/42
8,403,420 B2 * 3/2013 Billescas ................ A61G 5/128 297/423.37
9,351,901 B1 5/2016 Petsch
10,052,254 B2 8/2018 Chen
11,318,056 B2 * 5/2022 Malings ............... A61G 5/1043
12,280,005 B2 * 4/2025 Zuniga ...................... A61H 3/04
2004/0075327 A1 * 4/2004 Adams ................... A61G 5/128 297/423.4
2006/0032417 A1 * 2/2006 Goschy ................ A61G 5/1094 108/147
2013/0106077 A1 5/2013 Nagel
2018/0104133 A1 * 4/2018 Chen ...................... A61H 3/008

* cited by examiner

*Primary Examiner* — Valentin Neacsu
*Assistant Examiner* — Michael R Stabley
(74) *Attorney, Agent, or Firm* — Baldini Law, LLC; Jack Baldini, Esq.

(57) ABSTRACT

A device to operatively connect a walker and a wheelchair utilizing the wheelchair foot rest connection apparatus and the support pole of the walker to assist patients and physical therapists in gait training and restorative strength, endurance, and balance training. The device has an attachment clamp to grip the support pole of the walker and a proprietary mechanism to adapt for connection to the footrest attachment mechanism already existing on a wheelchair.

4 Claims, 10 Drawing Sheets

WALKER WHEELCHAIR CONNECTOR DEVICE

FIELD OF THE INVENTION

A device to operatively connect a walker and a wheelchair utilizing the wheelchair foot rest connection apparatus and the support pole of the walker to assist patients and physical therapists in gait training and restorative strength, endurance, and balance training. The device has an attachment clamp to grip the support pole of the walker and a proprietary mechanism to adapt for connection to the footrest attachment mechanism already existing on a wheelchair.

BACKGROUND

This disclosure relates to physical therapy and assisting patients, therapists, and hospital and post hospital recovery institutions in providing patients the ability to improve strength, endurance, and balance and recover normal ambulatory function. Even a brief hospital stay or minor procedure can render a patient weak and require restorative therapy. Major incidents, such as a stroke or illness requiring a major surgery can leave patients unable to walk until strength, endurance, and balance are restored through a long recovery process.

Physical therapists use gait training belts attached to the patient and themselves to provide a level of security. Another technique is to follow behind the patient pushing a wheelchair while the patient uses a walker so the patient has the ability to quickly sit and rest when needed. This can require additional personnel and it can also be awkward creating a fall scenario. There is also no possibility of the patient being able to practice walking exercise without the assistance of a therapist.

Therefore a need exists for a device to safely and easily allow a patient to use a walker to practice walking exercises that automatically trails a wheelchair at the proper distance behind in a secure and stable manner to allow the patient to sit as needed.

This need is magnified by the prior attempts at such a device. For example, in US Patent Publication No. 2013/0106077 to Nagel entitled, WHEELCHAIR PULL STRAP, disclosed is a "wheelchair pull strap for pulling a wheelchair behind a walking patient in case the patient needs to sit." The strap disclosed here has the disadvantage of interfering with the caregiver's hands, can interfere with the patient sitting in the wheel chair, and provides no stability to the wheel chair.

In U.S. Pat. No. 2,556,121 to Thomas, entitled, DETACHABLE WHEEL CHAIR WALKING APPARATUS, disclosed is an apparatus "as to be readily attached to and detached from a wheel chair, by the invalid himself, while seated in such chair." The disadvantage of this device is that it includes an entire walker, on wheels itself, making it expensive and cumbersome.

In U.S. Pat. No. 9,351,901 to Petsch, entitled, GAIT TRAINING TOOL, disclosed is, "an elongate frame structure having a proximal end and a distal end, with a wheelchair clamp attached to the proximal end. The tool further includes a walker connection attachment, and a manual gripping attachment, which can be interchangeably mounted on the distal end of the elongate frame structure for performing different forms of gait training." Disadvantages of this disclosure include that the attachment to the wheel chair are varied making it clear that the attachment is not important and the wheel chair is not stabilized and positioned behind the patient in a manner to allow the patient to easily sit.

Finally, in another example, and perhaps the closest known reference to the instant disclosure, U.S. Pat. No. 10,052,254 to Chen, entitled, APPARATUS AND METHOD FOR ASSISTING PATIENT WALKING THERAPY, discloses an, "apparatus and method using two couplings connecting a wheelchair to a walker for safely assisting a patient regaining their ability to walk . . . . The couplings provide a fixed gap between the wheelchair and walker and keeps the wheelchair close to the patient." The disadvantage here is that the coupling to the wheelchair is practically the same as the coupling to the walker and is a cam-lock lever coupling mechanism, that admittedly in FIG. 7, contemplates a moving jaw clamp that requires multiple adjustments and merely clamp onto the same downward pole of the arm of a wheelchair that it locks onto the support pole of the walker. This device does not even contemplate what the status of the footrests of the wheelchair is. Additional disadvantages of this arrangement are that the connecting bar is mounted much higher making it virtually impossible to connect, and then step into the middle to use, i.e., the connector bar would be too high to step over, meaning that first the patient must be between the walker and the wheelchair, and then connect the apparatus, which in itself can be a wieldy process making the whole setup cumbersome. There is also no disclosure of a telescoping tube for adjusting the distance between the walker and the wheelchair.

Therefore, there remains a need in the industry for a device that easily, quickly, and securely operatively connects a walker and a wheelchair that contemplates utilizing the already configured foot rests of the wheelchair that need to be removed for the walking exercises envisioned in this scenario, and which would then locate the connector devices much lower than previously known allowing for the user to step into and out of the connected device very easily.

SUMMARY

The present disclosure teaches embodiments of a device that is configured to clamp to the support pole of a walker on one end and on its opposite end, configured to interface with the foot rest connection mechanism of a wheelchair, be sufficiently rigid and of a length to provide a pre-configured amount of space between the walker and wheelchair when attached to be the optimum space for walking exercise while keeping the wheelchair the desired space behind the patient to allow the patient to easily sit when needed. In this configuration, it is conceived that two such devices would be utilized in tandem, one on each side to stabilize and secure the wheelchair without it turning or twisting behind the patient. Additionally, in the lower position of where the foot rest connection mechanism is, the device would not hinder a therapist in assisting the patient at the waist level. Just as easily as foot rests are removeable from a wheelchair, so to is the contemplated device easy to attach and remove, while it can remain clamped to the walker.

In one embodiment, the device described herein is configured with a clamping device for connecting one end of the device to a walker using hook and loop fastener making connecting the device at that end simple, secure and easy to connect and disconnect.

In one embodiment, the device described herein is configured with a proprietary hinge connection for connecting one end of the device to a wheelchair utilizing the already existing foot rest connector pegs making the device at that end simple, secure and easy to connect and disconnect.

In one embodiment, the device described herein is further configured with a telescoping and locking bar making length adjustments easy and secure. In various embodiments, the telescoping locking mechanism could be achieved through pin locks, twisting screw action, or other existing means.

In one embodiment, the device described herein is made from stainless steel, carbon fiber, high strength plastics, polycarbonate, other metals, fabric, or a combination thereof.

In one embodiment, the device described herein is configured with a quick release mechanism allowing the proprietary hinge connection for connecting one end of the device to a wheelchair utilizing the already existing foot rest connector pegs to remain secured while releasing the rest of the device bar allowing the wheelchair and the walker to separate while both ends of the device remain connected to the wheelchair and walker, respectively.

In one embodiment, the device described herein is configured to work in pairs, with one implemented on each of both the right and left sides of a wheelchair and the corresponding sides of a walker such that there is no twisting of the connected pair, but rather, even pulling of the wheelchair at a fixed pre-determined, but adjustable distance behind a walker.

In one embodiment, the connection of the device to the walker is 'loose-fitting' so that the user can easily manipulate the walker without each slight movement of the walker causing a corresponding movement of the wheelchair, but instead, only when the walker is moved forward (or backward) a desired amount, the wheelchair then follows along. In this secure, but loose connection, the user may then walk naturally without having to lift the weight of the walker and wheelchair (the natural result of a very tight-fitting, or fully clamped connection essentially making the walker/wheelchair/connector a unitary item) which causes additional strain on the user.

In several embodiments, the device as described herein and as depicted in the figures, because of how it is implemented with a secure, but loose-fitting on the walker attachment, its lower placement at the level of the footrest pegs of the wheelchair, and its ease of deployment and adjustment, offers significant advantages over other existing devices in this area. The presently described device does not 'trap' the patient in the area between the wheelchair and the walker and the attached devices and allows for an assistant if desired, to easily still assist the user. Other known devices do not have some or all of these advantages.

DETAILED DESCRIPTION

For clarity of disclosure, and not by way of limitation, the detailed description of the invention is divided into the following subsections that describe or illustrate certain features, embodiments or applications of the present invention.

Definitions

Figure 1:
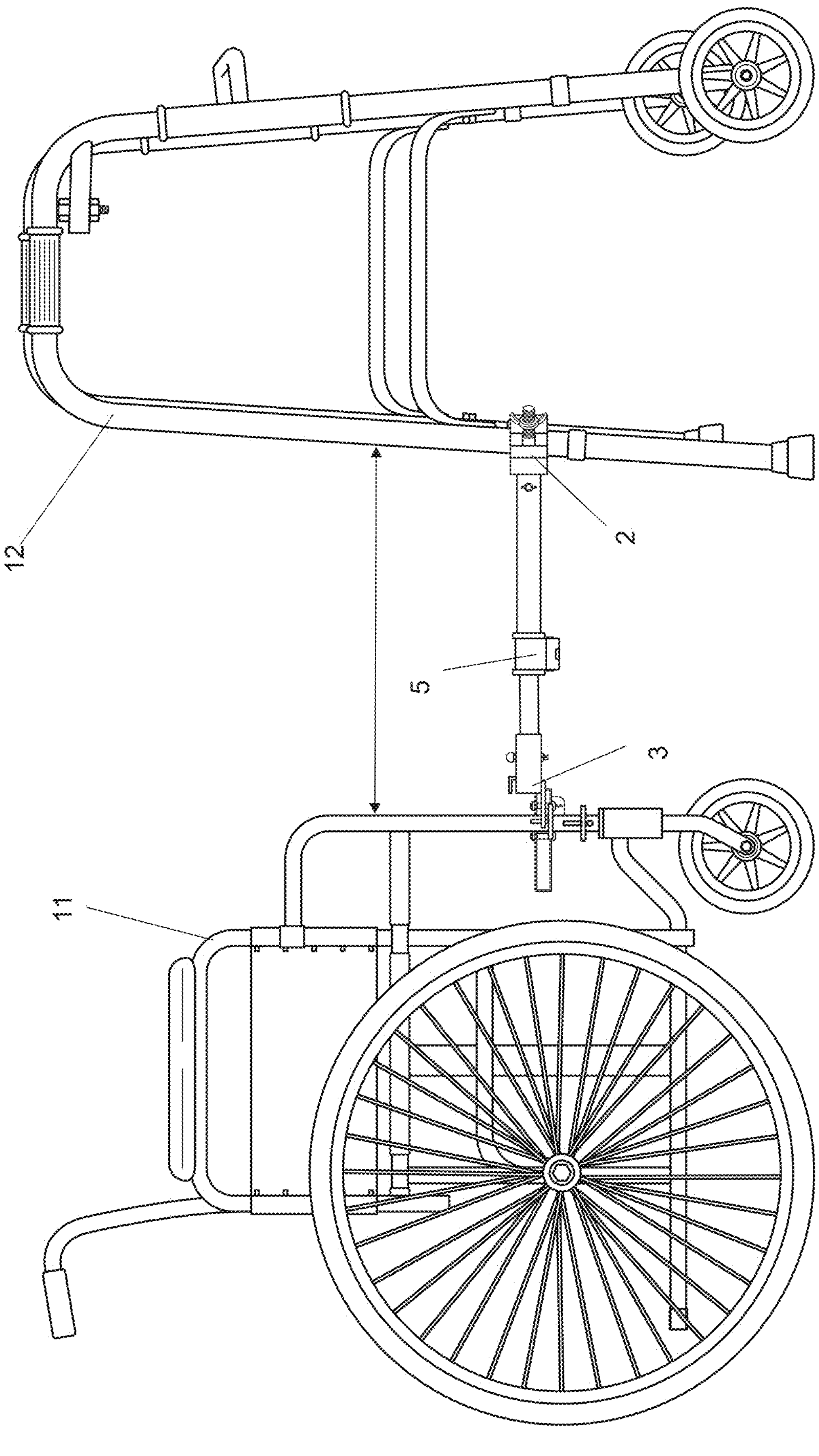
FIG. 1 depicts one embodiment of the present disclosure showing the device as described connecting a typical wheelchair to a typical walker utilizing the proprietary connection mechanism as described herein implementing the foot rest connector pegs of the wheelchair.

"walker" as used herein means any single standard support device that facilitates a patient to be able to use both arms and hands to steady themselves during walking, gait training and walk therapy. A typical walker is as is shown in FIG. 1.

"wheelchair" as used herein means a seat or chair that is fitted with wheels such that a person sitting in such seat or chair can maneuver themselves (or be maneuvered by another person) by moving the wheels, and which has removeable, deployable footrests. A typical wheelchair is as is shown in FIG. 1.

"foot rest connector pegs" as used herein means the typical connection mechanism employed in a typical wheelchair to connect a deployable, foldable, foot rest that is easily removed in instances where a foot rest is not desirable containing pegs attached to the down bars of the front of the wheelchair under which the front wheels are connected, onto which a foot rest sits.

The Device and Method of Using the Device of the Present Invention

Figure 11:
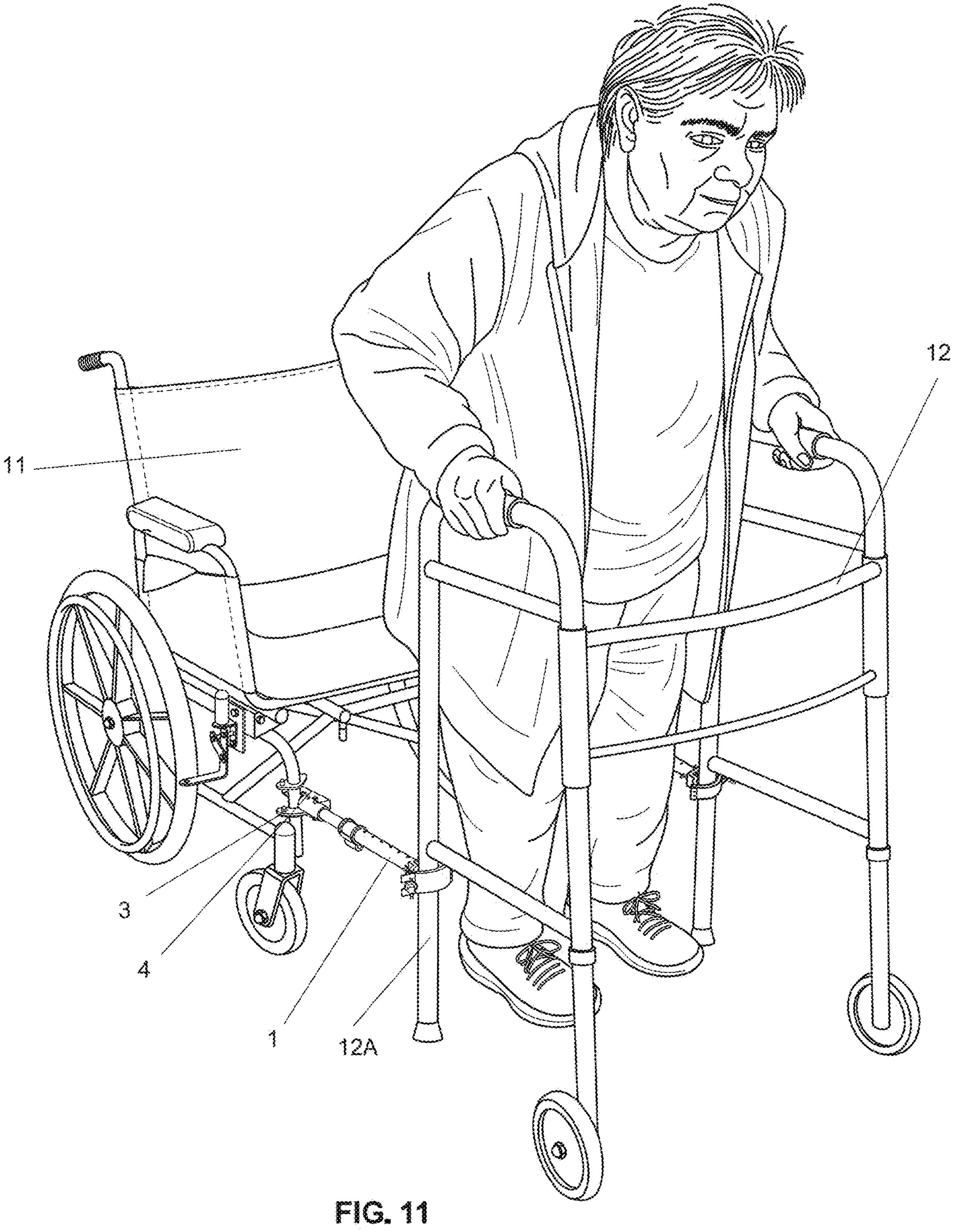
FIG. 11 depicts one embodiment of the present disclosure showing a typical human utilizing a walker with a wheelchair connected to it with a set of devices, one on each side, implemented as described.

A typical connector device (1) as described herein is formed having a proprietary apparatus on one end (3) that mounts onto an existing foot rest attachment pegs (10) of a standard wheelchair (11), and on its opposite end, a clamping device (2) to secure that end to the vertical support bars (12A) of a standard walker (12) and each end connected via a sturdy bar with adjustability (5). In a typical deployment, two such connector devices (1) are implemented at one time, each one connected on each side of a wheelchair and on the corresponding side of a walker, substantially as shown in FIG. 11.

When two connector devices as described herein are utilized properly, while a person is using a walker (12), the attached wheelchair (11) follows behind at a predefined distance such that the person can just sit down into the wheelchair at any desired time, but while walking, the wheelchair stays a safe distance behind such that it does not interfere with the walking.

Figure 10:
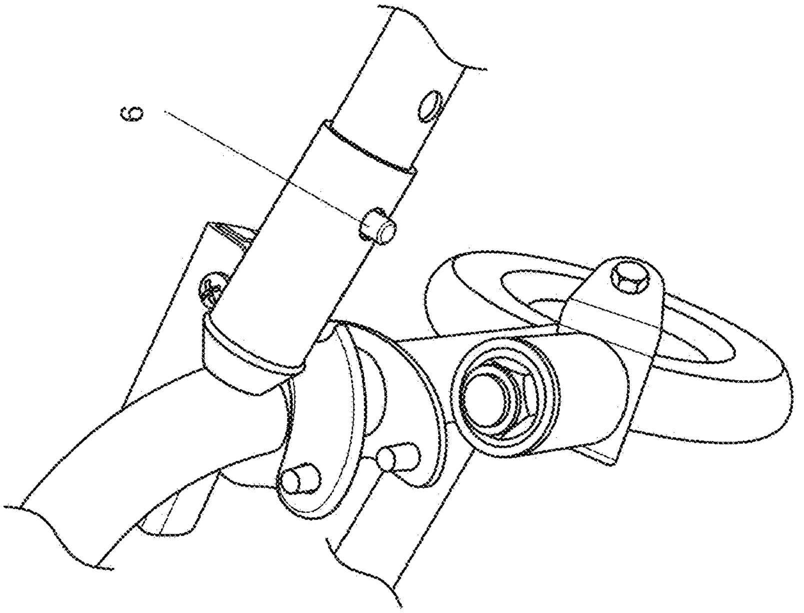
FIG. 10 depicts one embodiment of the present disclosure showing the proprietary connection mechanism that connects to the foot rest connector pegs of a wheelchair being set in place on those connector pegs and once in place, essentially locked in place.
Figure 9:
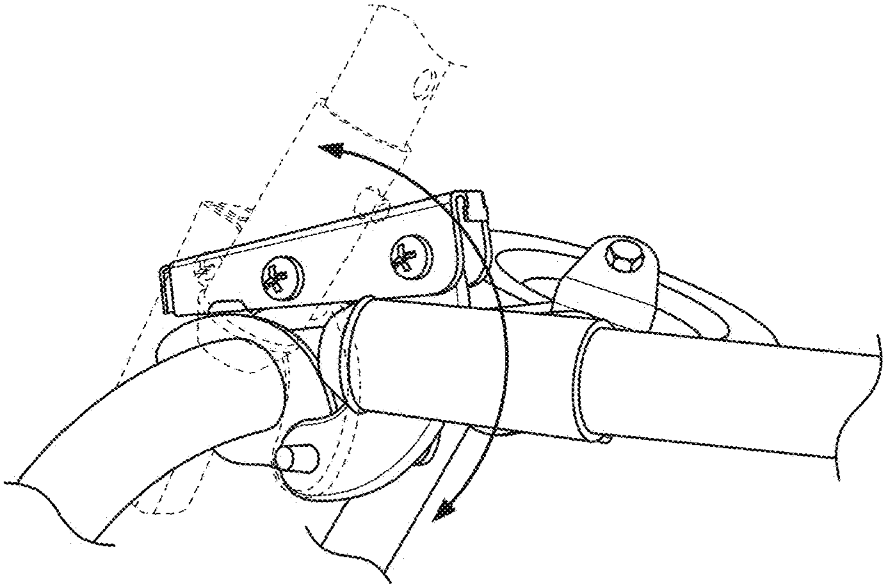
FIG. 9 depicts one embodiment of the present disclosure showing the proprietary connection mechanism that connects to the foot rest connector pegs of a wheelchair being set in place on those connector pegs and the movement to set it in place.
Figure 8:
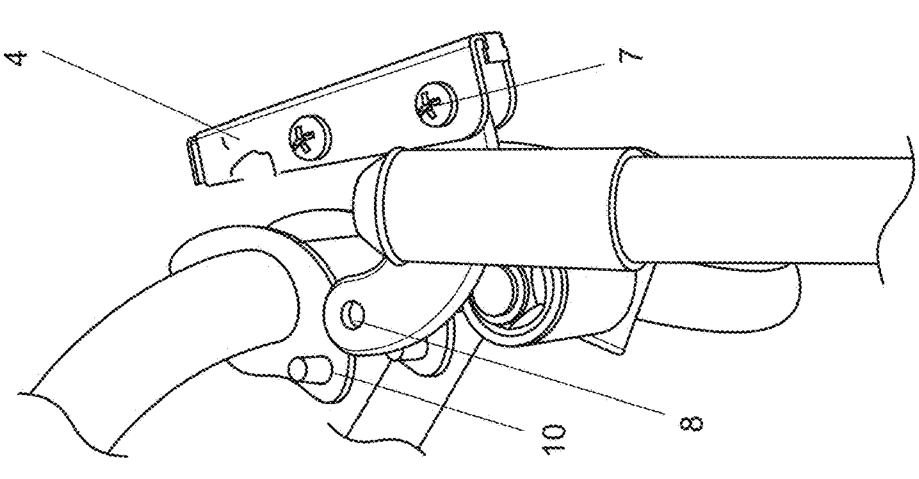
FIG. 8 depicts one embodiment of the present disclosure showing the proprietary connection mechanism that connects to the foot rest connector pegs of a wheelchair being set in place on those connector pegs.

As described, the objective is to assist a person who has a short or long term injury or disability during their recovery or walk therapy. In one embodiment, the apparatus has been designed to mount as a connector (3) with a connector hole (8) configured to interface with the existing mounting pegs (10) on the front side of a wheelchair frame with a spring hinge (7) to allow the device to sit onto the foot rest pegs (10) and then secure in place, substantially as shown in FIGS. 8-10, and provide a stationary, secure, and stable connection between the wheelchair and a walker without the use of clamps (on the wheelchair side) allowing a wheelchair to follow behind a walker at a predefined optimal desired distance.

In one embodiment, the apparatus described herein is installed on both sides of the front of a wheelchair and the corresponding sides of the back of a walker, and includes a solid connection on one end that attaches and locks into the wheelchair utilizing a hinge lock mechanism (7), while the other end of the device is fitted to the rear legs of a walker (12A) with a means to clamp onto the downward support bars of a walker and could implement hook and loop fastener straps (2A) that are wrapped around each side of the walker. In this embodiment, in the center of each device there is a telescoping tube (5) with a snap lock which allows the user to adjust the length of the device to make the wheelchair and walker positioned at a suitable distance for the person utilizing the apparatus. As described herein, this functionality introduces not only a safety function but also reduces the requirement and need for an aid, nurse or therapist or other third party that is currently required to push the wheelchair behind the person walking while using a walker. This will be a savings to any facility by eliminating countless man hours for those that are providing the care.

In one embodiment, the device is fitted with a quick release (6) mechanism at the end where the device is attached to the wheelchair (11) so that the device can be removed without having to disconnect the device from the foot rest pegs of the wheelchair, allowing for easier adjustment of length, as well as easier complete disconnect from the wheelchair in instances where that is desirable. This makes for easier reconnect as well.

In one embodiment, the device has a proprietary mechanism (3) at its one end that is configured to fit onto existing foot rest pegs (10) of a wheelchair wherein the device (3) has a hole (8) that is configured to sit onto the foot rest peg (10) on one side, and a second hole (9) that is configured to attach to the spring hinge (7) and clamping mechanism (4) to secure to the wheelchair bar when fitted onto the foot rest peg.

The various embodiments of the securement of the device to the walker are preferred to be secure but not overly tight such that movement of the walker is allowed up and down without affecting the positioning of the wheelchair, but secure enough that any significant forward or rearward motion, more than an inch or so, maintains the distance between the wheelchair and the walker as predetermined by the user or a helper (see FIG. 1 and the arrowed line that shows the distance between the walker and the wheelchair, which is adjustable by adjusting the length of the device through adjustment mechanism (5).

Figure 2:
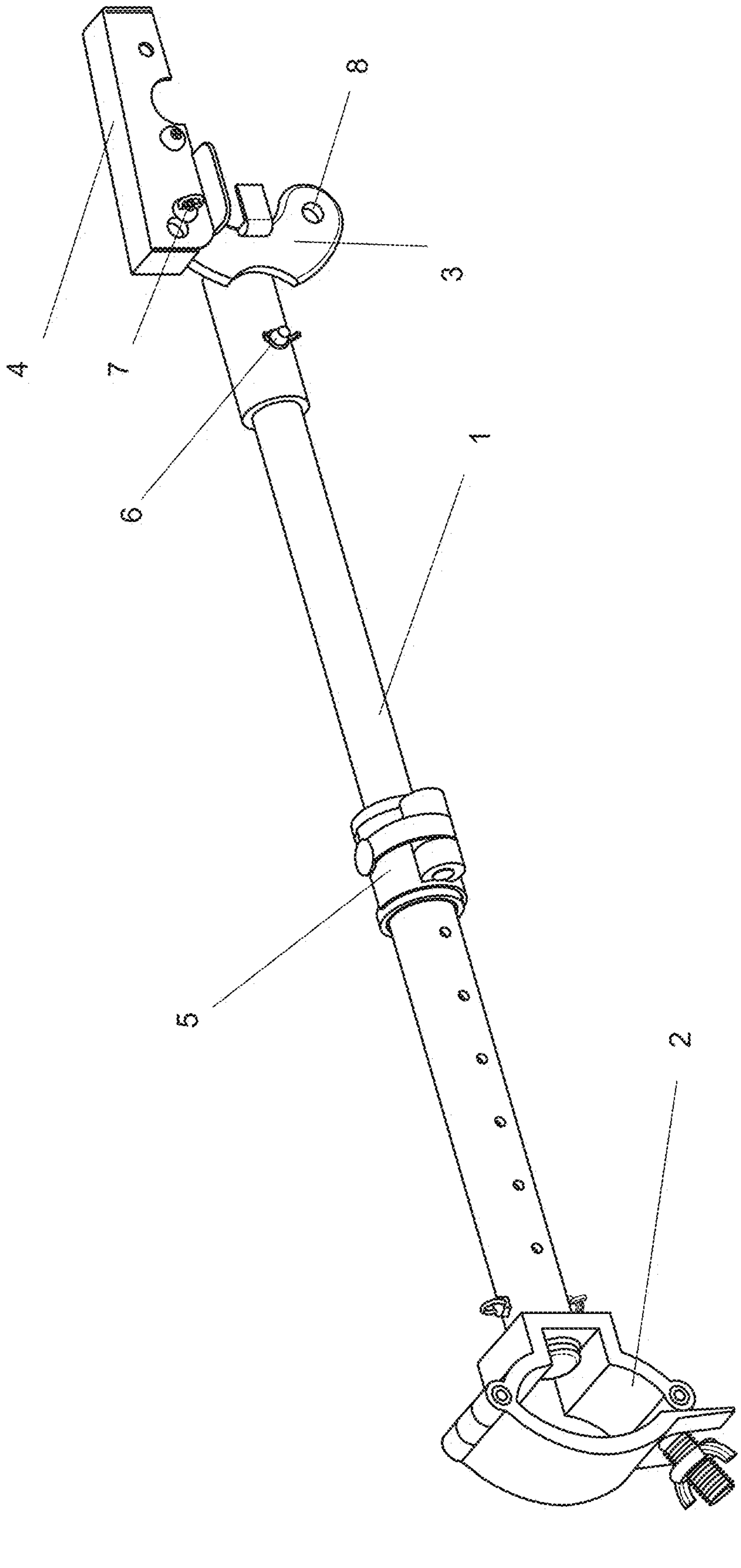
FIG. 2 depicts one embodiment of the present disclosure showing one configuration of the device depicting at one end, the mechanism to connect to the foot rest connector pegs of a wheelchair and on the other end one embodiment of a connection to the post of a walker and also depicting that the overall length of the device is adjustable.
Figure 3:
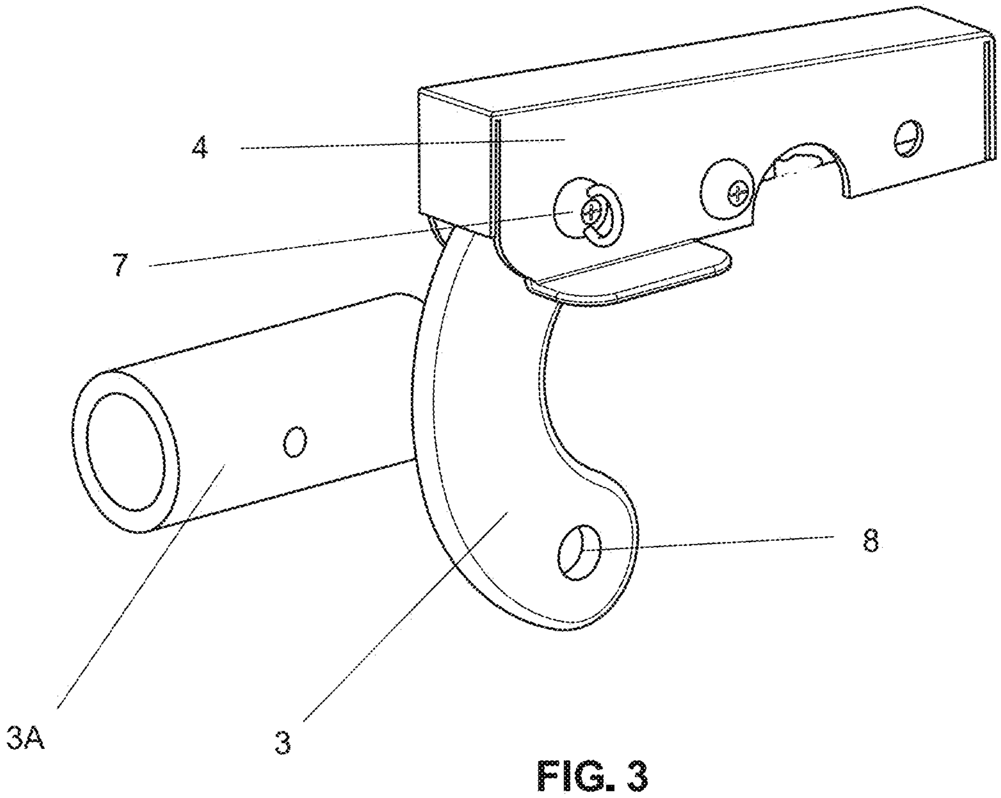
FIG. 3 depicts one embodiment of the present disclosure showing one view of the proprietary connection mechanism that connects to the foot rest connector pegs of a wheelchair.
Figure 4:
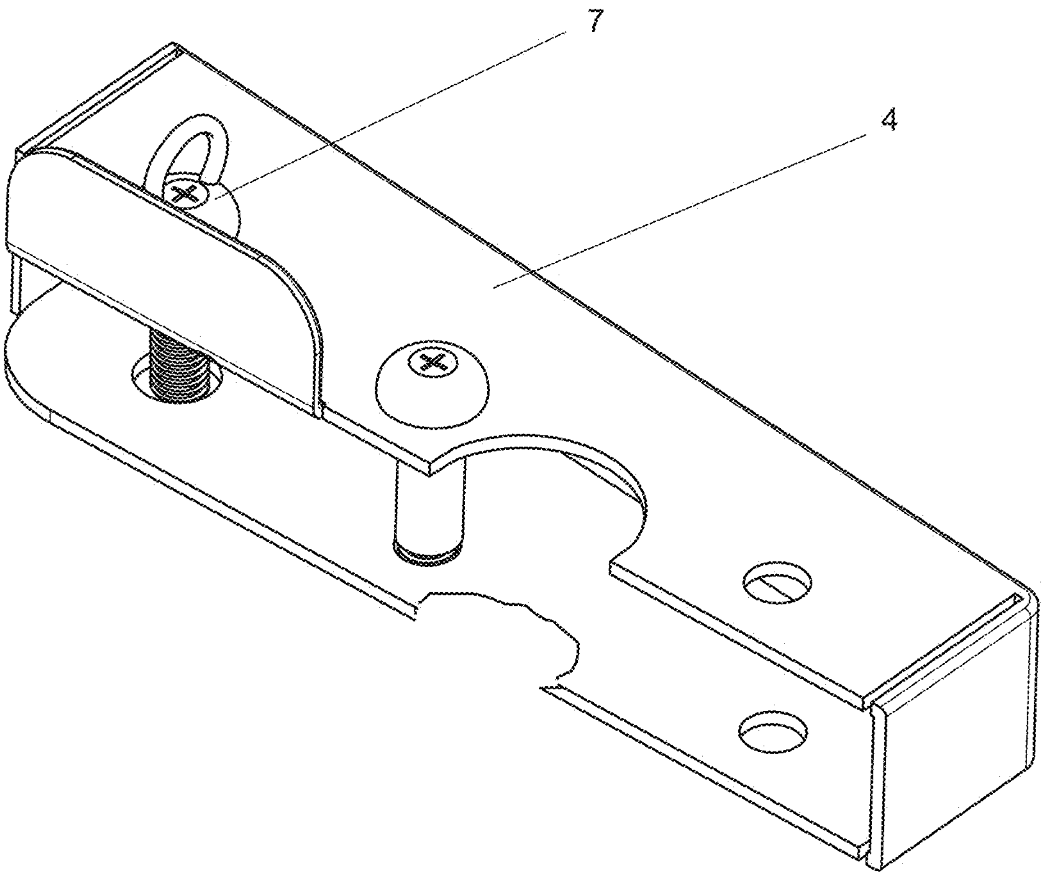
FIG. 4 depicts one embodiment of the present disclosure showing a side view of the proprietary connection mechanism that connects to the foot rest connector pegs of a wheelchair.
Figure 5:
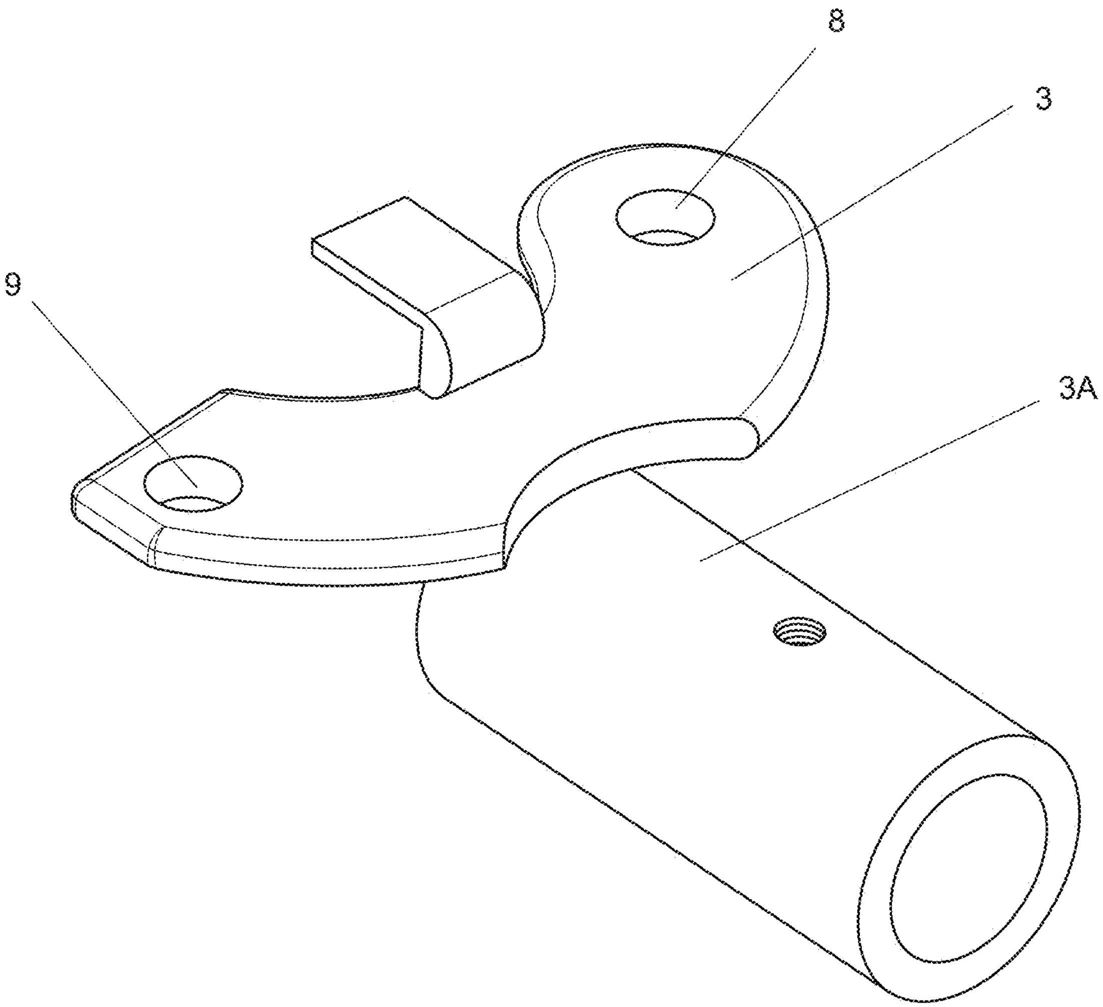
FIG. 5 depicts one embodiment of the present disclosure showing one view of the part of the proprietary connection mechanism that connects to the foot rest connector pegs of a wheelchair that connects that mechanism to the adjustable bar.
Figure 6:
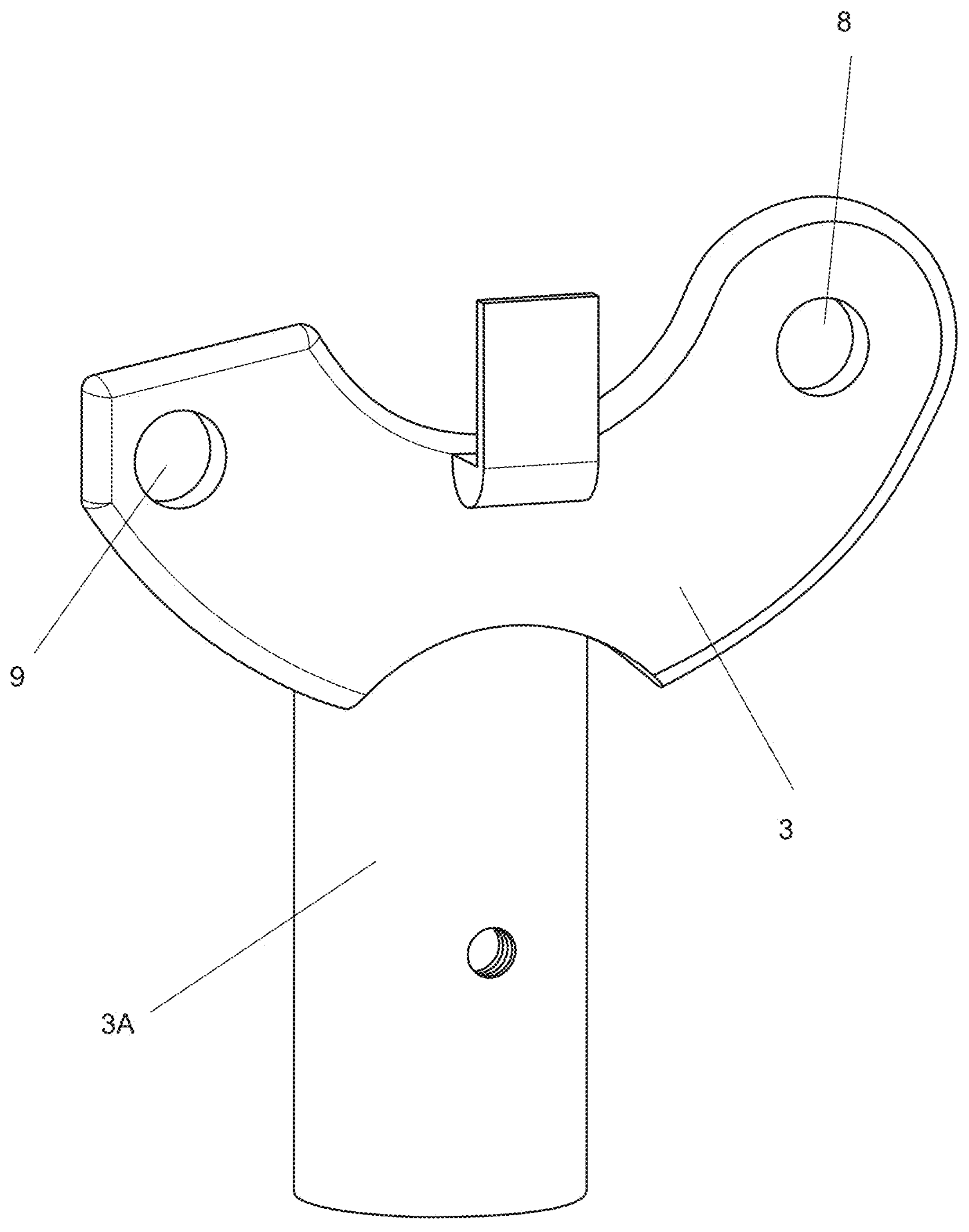
FIG. 6 depicts one embodiment of the present disclosure showing an alternate view of the part of the proprietary connection mechanism that connects to the foot rest connector pegs of a wheelchair that connects that mechanism to the adjustable bar.
Figure 7A:
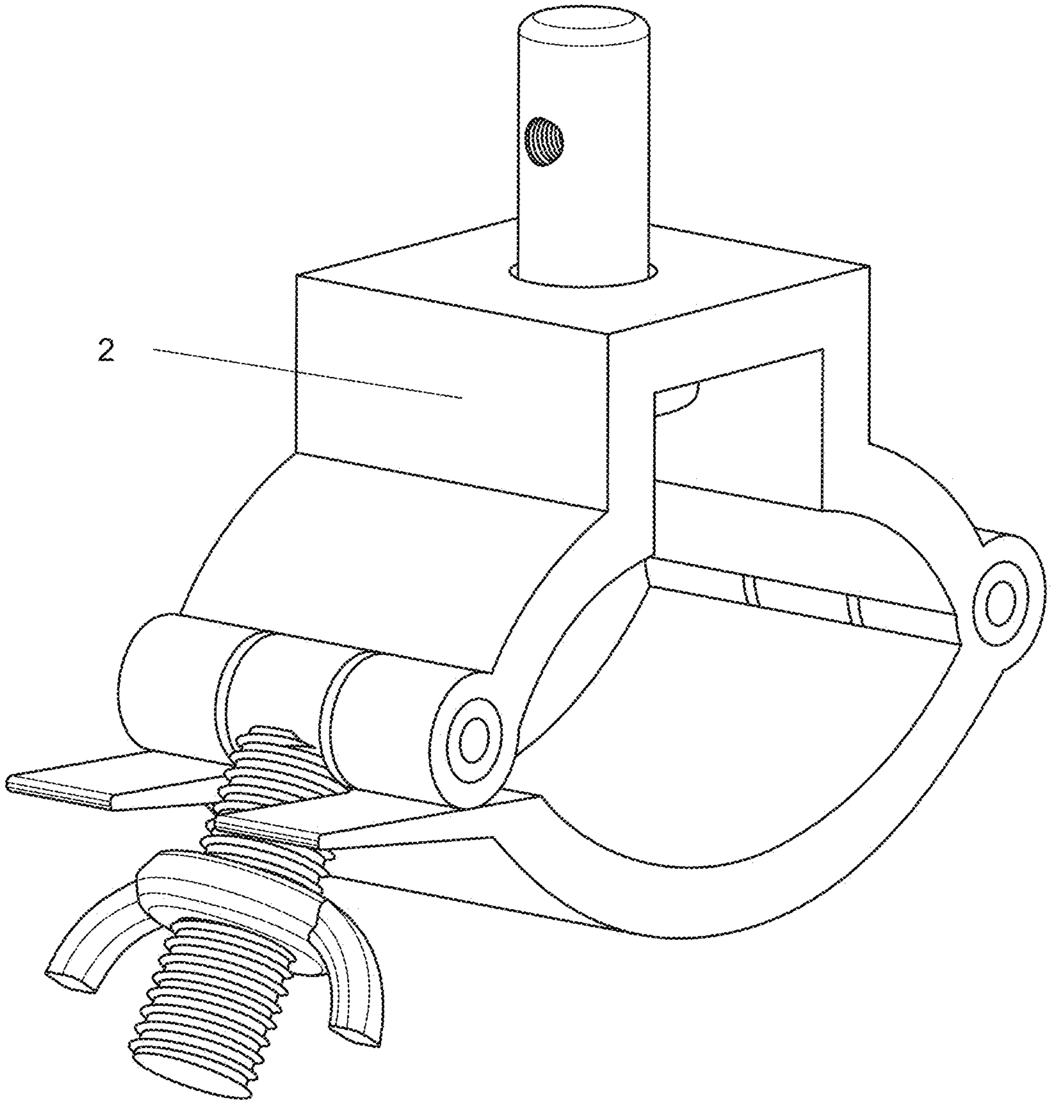
FIG. 7A depicts one embodiment of the present disclosure showing one means of connection of the end of the device as described that connects to the pole of a walker.
Figure 7B:
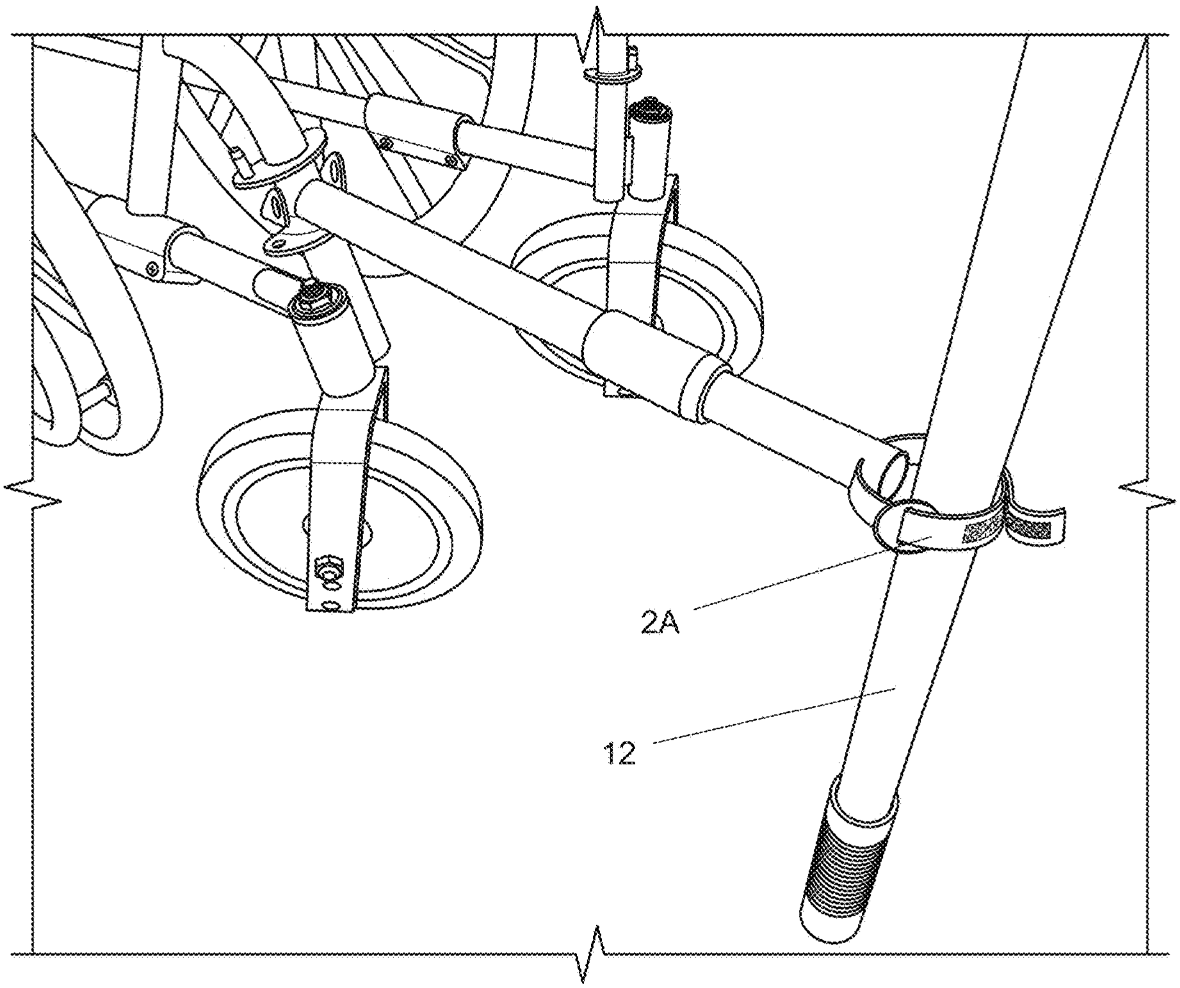
FIG. 7B depicts an alternate embodiment of the present disclosure showing a means of connection of the end of the device as described that connects to the pole of a walker being a hook and loop fastener.

The basic construction of the device as described herein is shown in the Figures. As shown in FIG. 2, there is the overall device (1), a telescoping adjustable bar, with a length adjusting mechanism (5) and at one end, a clamping device (2) to connect that end to a walker. A close-up of the clamping mechanism is shown in FIG. 7A while an alternate embodiment of such a clamping device is shown in FIG. 7B with a hook and loop fastener. On the opposite end of the device is a proprietary mechanism configured to interconnect with the existing foot rest pegs of a wheelchair. First, there is a flat rounded component (3) with two holes (8) and (9). This component attaches to the device via a bar attachment (3A). Alternatively, this could be a one-piece construction with that end of the device, but it is preferred to have a quick release button (6) so that it is detachable from the rest of the device when desired. On the flat rounded component (3), the two holes are configured such that the first hole (8) is configured to connect to the now exposed foot rest connection pegs (10) of the wheelchair. The other hole (9) is configured to attach the spring hinge (7) clamping bar (4) such that when the foot rest hole (8) is inserted onto the foot rest pegs (10) of the wheelchair, the clamping bar (4) can be pulled open and fitted around the bar of the wheelchair and then snaps into place. See FIGS. 8, 9, and 10 for detail on this operation. Then, once in place, the user may disconnect either by reversing the connection method just described and shown, or by using the quick release button (6) as shown in FIG. 10 to separate the device into two pieces, one part remaining connected to the wheelchair and the other part remaining connected to the walker.

EXAMPLES

The present invention is further illustrated, but not limited by, the following examples.

A typical use of the connector device as described herein is for example, when a patient needing gait training or some type of walk therapy to regain balance and/or strength, who, in the absence of some balance aid such as a walker, would need a wheelchair, but would use a walker for practicing walking exercises to regain strength and balance, uses the walker to assist in balance while walking. Typically, an aid would walk behind the patient with the wheelchair in case the patient gets tired, loses balance, or otherwise would need or desire the wheelchair, while a therapist walks alongside the patient, assisting, teaching, and/or monitoring the therapy session. With the implementation of this device (or pair of devices), if the patient needs the wheelchair, it is immediately available to them to just sit back and into without any need for an aid to follow behind, leaving a single therapist free to focus one hundred percent attention on the patient. Moreover, since the devices here are located at the level of the foot rest pegs of a wheelchair, i.e., fairly low to the ground, the devices do not get in the way or otherwise interfere with a therapist who is alongside a patient as would happen where the devices are attached higher. Since the devices are also quickly releasable, in situations where it is desirable to get the patient out from the confines of the walking area created between the wheelchair and walker, it is easily and quickly attainable.

In this situation where the patient would desire to engage in exercises without the need of a therapist, or just to have a measure of independence, two of the devices as described above would be deployed, one on each side of a wheelchair by first removing the foot rest off of its pegs exposing the connector pegs. Then, one at a time, one device is set in place on one side, then the other one on the other side. Then the walker is moved towards the sitting patient, sitting in the wheelchair and the other ends of each of the devices is attached to the corresponding side of the walker. The lengths are adjusted so that there is the desired amount of space between the walker and the wheelchair and then the patient can use the walker to prop themself up and begin to walk and conduct their exercise. As they move forward, the wheelchair follows behind at the same distance as was determined was preferable when the session began, the patient now knowing they can just sit back in the same manner as they had stood up and the wheelchair will be at the same point behind them to sit into.

As the patient walks, in one embodiment where it is preferred that the connector to the walker is not tight, but just loose enough to allow some movement, but secure and snug enough to not allow the wheelchair to be at a significantly different distance while walking forward, in this manner, the patient can manipulate the walker to conduct the exercises without interference from the wheelchair, but all the while, keeping the wheelchair at a preferred and safe distance just behind the patient. In this way, the patient gains independence and a sense of security and accomplishment.

All of the other devices in this field have shown to be too difficult or cumbersome to attach into place, are too tightly attached so that any movement of either the walker or the wheelchair to significantly affects the movement of the other, and are too difficult to adjust easily. The embodiments described herein overcome all of these shortcomings.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A device for operatively attaching a walker and a wheelchair comprising foot rest attachment pegs comprising:

- a telescoping bar with a means to lock the bar at a desired length;
- wherein the telescoping bar at a first end comprises a means to clamp said bar securely to a walker;
- and further wherein the telescoping bar at its opposite second end comprises a means to attach said bar to a single-foot rest attachment peg of the wheelchair without any footrest attached; and
- further wherein the means to clamp the device at its first end to a walker is configured to be secure and loose-fitting such that the walker can be manipulated without the weight or influence of the device or the wheelchair.

2. The device of claim 1, wherein said means to clamp the device at its first end to a walker is a hook and loop fastener.

3. The device of claim 1, wherein the means to attach said bar at its second end comprises a mechanism with a hole configured to fit over the foot rest attachment peg of a wheelchair and further comprising a spring loaded clamping bar to grab the leg of the wheelchair when said hole is sitting on said foot rest attachment peg.

4. The device of claim 3, further comprising a quick release button allowing the device to be separated into two parts, while each end remains attached to its respective attachment components.

* * * * *